United States Patent [19]

Estelle

[11] Patent Number: 5,132,846
[45] Date of Patent: Jul. 21, 1992

[54] MICROFILM READER/PRINTER ZOOM LENS

[75] Inventor: Lee R. Estelle, Rochester, N.Y.

[73] Assignee: Eastman Kodak Company, Rochester, N.Y.

[21] Appl. No.: 361,466

[22] Filed: Jun. 5, 1989

[51] Int. Cl.$^5$ ............................................. G02B 15/00
[52] U.S. Cl. ......................................... 359/676; 359/683
[58] Field of Search ............. 350/423, 427, 429, 449, 350/450

[56] References Cited

U.S. PATENT DOCUMENTS

| | | | |
|---|---|---|---|
| 3,724,927 | 4/1973 | Cox | 350/203 |
| 4,708,444 | 11/1987 | Tsuji | 350/450 |
| 4,733,951 | 3/1988 | Pareigat | 350/423 |
| 4,743,102 | 5/1988 | Pareigat | 350/423 |
| 4,746,204 | 5/1988 | Pareigat | 350/423 |
| 4,750,820 | 6/1988 | Pareigat | 350/423 |
| 4,824,236 | 4/1989 | Ueda | 350/427 |

Primary Examiner—Paul M. Dzierzynski
Attorney, Agent, or Firm—Svetlana Z. Short

[57] ABSTRACT

A zoom lens system having a large magnification is particularly useful in micrographic reader/printers, and any type of projection lens system. The lens comprises at least three components. The first component is provided with a fixed aperture stop. The other two components are axially movable for zooming.

32 Claims, 8 Drawing Sheets

FIG. 1

| GROUP | RADIUS | THICKNESS | SPACING | REFRACTIVE INDEX $N_d$ | Abbé No. $V_d$ |
|---|---|---|---|---|---|
| A | $R_1=-27.4940$ | $t_1=1.000$ | | 1.498 | 67.0 |
| | $R_2=44.4114$ | | .350 | | |
| | Diaphragm | | $S_1=$(8.732 at EF=19.00<br>(4.954 at EF=21.82<br>(1.000 at EF=25.00 | | |
| B | $R_3=69.1543$ | $t_2=3.000$ | | 1.620 | 63.5 |
| | $R_4=-38.8913$ | | .200 | | |
| | $R_5=97.7704$ | $t_3=8.065$ | | 1.620 | 63.5 |
| | $R_6=-8.7401$ | $t_4=1.700$ | | 1.613 | 44.3 |
| | $R_7=-68.6709$ | | $S_2=$(3.898 at EF=19.00<br>(6.758 at EF=21.82<br>(8.996 at EF=25.00 | | |
| C | $R_8=-12.6465$ | $t_5=1.800$ | | 1.548 | 45.8 |
| | $R_9=-58.2268$ | $t_6=9.3500$ | | 1.720 | 42.0 |
| | $R_{10}=-21.3505$ | | .200 | | |
| | $R_{11}=57.2194$ | $t_7=6.775$ | | 1.773 | 49.6 |
| | $R_{12}=-57.2194$ | | $S_3=$( .900 at EF=19.00<br>(1.816 at EF=21.82<br>(3.537 at EF=25.00 | | |
| D | $R_{13}=35.6902$ | $t_8=3.672$ | | 1.589 | 61.3 |
| | $R_{14}=\infty$ (plano) | | .200 | | |
| | $R_{15}=17.5232$ | $t_9=5.582$ | | 1.523 | 51.5 |
| | $R_{16}=-27.7259$ | $t_{10}=1.00$ | | 1.847 | 23.8 |
| | $R_{17}=12.6979$ | | 9.000 | | |
| | $R_{18}=\infty$ (plano) | $t_{11}=3.175$ | | 1.523 | 58.6 |
| | $R_{19}=\infty$ (plano) | | | | |

FIG. 2

| FOCAL LENGTH (EF) mm | BACK FOCAL LENGTH mm | LENS LENGTH mm | 1/Mag |
|---|---|---|---|
| 19.00 | 11.11 | 56.424 | 49.997 |
| 21.82 | 11.12 | 56.422 | 43.548 |
| 25.00 | 11.10 | 56.427 | 38.013 |

| GROUP | RADIUS | THICKNESS | SPACING | REFRACTIVE INDEX $N_d$ | Abbé No. $V_d$ |
|---|---|---|---|---|---|
| A' | $R_1'=-54.4437$<br>$R_2'=-39.1630$<br>Diaphragm | $t_1'=1.000$ | .200<br>$S_1'=$(25.694 at EF=23.11<br>(13.373 at EF=30.50<br>(1.000 at EF=40.12 | 1.487 | 70.4 |
| B' | $R_3'=67.9085$<br>$R_4'=-67.9085$<br>$R_5'=-98.0453$<br>$R_6'=-113.335$<br>$R_7'=-49.7031$ | $t_2'=4.735$<br>$t_3'=1.300$<br>$t_4'=5.593$ | .200<br>$S_2'=$(1.000 at EF=23.11<br>(8.991 at EF=30.5<br>(11.255 at EF=40.12 | 1.691<br>1.847<br>1.691 | 54.7<br>23.8<br>54.7 |
| C' | $R_8'=33.2770$<br>$R_9'=\infty$ (plano)<br>$R_{10}'=-58.7660$<br>$R_{11}'=143.690$<br>$R_{12}'=-62.1033$<br>$R_{13}'=31.7598$<br>$R_{14}'=79.8413$<br>$R_{15}'=-36.3834$ | $t_5'=5.447$<br>$t_6'=1.300$<br>$t_7'=1.300$<br>$t_8'=7.046$ | 1.506<br>5.073<br>10.151<br>$S_3'=$(1.000 at EF=23.11<br>(5.331 at EF=30.50<br>(15.440 at EF=40.12 | 1.786<br>1.596<br>1.583<br>1.773 | 44.2<br>39.2<br>46.5<br>49.6 |
| D' | $R_{16}'=-40.9417$<br>$R_{17}'=-198.965$<br>$R_{18}'=-21.4221$<br>$R_{19}'=-29.7505$<br>$R_{20}'=20.4777$<br>$R_{21}'=\infty$ (plano)<br>$R_{22}'=\infty$ (plano) | $t_9'=4.207$<br>$t_{10}'=7.600$<br>$t_{11}'=1.100$ | .150<br>8.077<br>3.175 | 1.658<br>1.487<br>1.847<br>1.523 | 57.3<br>70.4<br>23.8<br>58.6 |

FIG. 5

| FOCAL LENGTH (EF) mm | BACK FOCAL LENGTH mm | LENS LENGTH mm | 1/Mag |
|---|---|---|---|
| 23.11 | 10.17 | 85.602 | 39.987 |
| 30.50 | 10.18 | 85.602 | 30.298 |
| 40.12 | 10.08 | 85.603 | 23.032 |

| GROUP | RADIUS | THICKNESS | SPACING | REFRACTIVE INDEX $N_d$ | Abbé No. $V_d$ |
|---|---|---|---|---|---|
| A''' | $R_1'''=-25.0067$ | $t_1'''=.920$ | | 1.589 | 61.3 |
| | $R_2'''=-187.6770$ | | .580 | | |
| | $R_3'''=-26.9005$ | $t_2'''=1.802$ | | 1.785 | 26.1 |
| | $R_4'''=-21.3505$ | | .300 | | |
| | Diaphragm | | $S_1'''=$(27.927 at EF=30.99 | | |
| | | | (14.866 at EF=45.32 | | |
| | | | (1.288 at EF=66.24 | | |
| B''' | $R_5'''=264.285$ | $t_3'''=7.360$ | | 1.607 | 56.7 |
| | $R_6'''=-18.6398$ | $t_4'''=2.200$ | | 1.762 | 26.5 |
| | $R_7'''=-39.7923$ | | .200 | | |
| | $R_8'''=27.3155$ | $t_5'''=8.580$ | | 1.697 | 55.5 |
| | $R_9'''=247.270$ | | .500 | | |
| | $R_{10}'''=36.6669$ | $t_6'''=9.149$ | | 1.772 | 49.7 |
| | $R_{11}'''=44.0154$ | | 2.325 | | |
| | $R_{12}'''=-781.592$ | $t_7'''=1.380$ | | 1.750 | 35.0 |
| | $R_{13}'''=15.3355$ | | $S_2'''=$(3.468 at EF=30.99 | | |
| | | | (19.571 at EF=45.32 | | |
| | | | (34.731 at EF=66.24 | | |
| C''' | $R_{14}'''=-46.1808$ | $t_8'''=7.396$ | | 1.720 | 50.4 |
| | $R_{15}'''=-54.600$ | | $S_3'''=$(5.623 at EF=30.99 | | |
| | | | (2.579 at EF=45.32 | | |
| | | | (1.000 at EF=66.24 | | |
| D''' | $R_{16}'''=-129.668$ | $t_9'''=1.525$ | | 1.689 | 31.2 |
| | $R_{17}'''=\infty$ (plano) | | 6.753 | | |
| | $R_{18}'''=\infty$ (plano) | $t_{10}'''=3.175$ | | 1.523 | 58.6 |
| | $R_{19}'''=\infty$ (plano) | | | | |

FIG. 8

| FOCAL LENGTH (EF) mm | BACK FOCAL LENGTH mm | LENS LENGTH mm | 1/Mag |
|---|---|---|---|
| 30.99 | 8.88 | 81.235 | 29.990 |
| 45.32 | 8.82 | 81.233 | 20.506 |
| 66.24 | 8.71 | 81.236 | 14.028 |

| GROUP | RADIUS | THICKNESS | SPACING | REFRACTIVE INDEX $N_d$ | Abbé No. $V_d$ |
|---|---|---|---|---|---|
| A··· | $R_1$···=−22.3272 | $t_1$···=.920 | | 1.589 | 61.3 |
| | $R_2$···=−152.417 | | .658 | | |
| | $R_3$···=−24.5170 | $t_2$···=3.597 | | 1.785 | 26.1 |
| | $R_4$···=−20.2898 | | .304 | | |
| | Diaphragm | | $S_1$···=(24.591 at EF=30.93 (13.215 at EF=45.25 (1.288 at EF=66.11 | | |
| B··· | $R_5$···=115.456 | $t_3$···=6.774 | | 1.607 | 56.7 |
| | $R_6$···=−19.3520 | $t_4$···=2.200 | | 1.762 | 26.5 |
| | $R_7$···=−51.0875 | | .200 | | |
| | $R_8$···=37.0941 | $t_5$···=7.880 | | 1.697 | 55.5 |
| | $R_9$···=−191.942 | | .500 | | |
| | $R_{10}$···=47.5664 | $t_6$···=16.610 | | 1.772 | 49.7 |
| | $R_{11}$···=48.3198 | | 2.145 | | |
| | $R_{12}$···=−185.241 | $t_7$···=1.380 | | 1.750 | 35.0 |
| | $R_{13}$···=16.1734 | | $S_2$···=(3.468 at EF=30.93 (18.206 at EF=45.25 (32.124 at EF=66.11 | | |
| C··· | $R_{14}$···=38.8350 | $t_8$···=8.746 | | 1.720 | 50.4 |
| | $R_{15}$···=−60.5419 | | $S_3$···=(8.066 at EF=30.93 (4.702 at EF=45.25 (2.715 at EF=66.11 | | |
| | $R_{16}$···=∞ (plano) | $t_9$···=3.175 | | 1.523 | 58.6 |
| | $R_{17}$···=∞ (plano) | | | | |

FIG. 11

| FOCAL LENGTH (EF) mm | BACK FOCAL LENGTH mm | LENS LENGTH mm | 1/Mag |
|---|---|---|---|
| 30.93 | 11.80 | 79.972 | 29.997 |
| 45.25 | 8.40 | 83.333 | 20.505 |
| 66.11 | 6.32 | 85.324 | 14.031 |

FIG. 12

MICROFILM READER/PRINTER ZOOM LENS

BACKGROUND OF THE INVENTION

1. Field of the Invention

The present application relates to variable focal length lenses and in particular to lens systems for use with micrographic projectors and printers.

2. Description Relative to the Prior Art

In order to conserve space, documents are often stored photographically with their size greatly reduced on microfilm, microfiche, or other media. Such processes and media are known generally by the term micrographics.

In order to utilize a document which has been stored in micrographic format, a projector or reader is required. Such a reader will produce an enlarged reproduction of the reduced image on a screen for viewing by the operator. Often such readers also include a printer. When a desired document has been located by projection onto the screen, the operator may produce a permanent enlarged copy through photographic or plain paper copier techniques. Systems which permit such reading and printing are known as reader/printers. The term reader/printer will be used herein to denote both readers containing only a projector and those including a printer in addition to a projector.

A problem which arises in the use of such systems relates to the fact that different reduction factors may be used in recording the micrographic images and that recorded documents may be of different sizes. As a result, different magnifications are required in order to reproduce properly such images or to make a reproduced image fill a desired area. In order to accommodate such variations, micrographic reader/printers are commonly provided with lenses having a variety of magnifications. In some cases, as many as fifteen or more lenses are required to accommodate all possible enlargement factors that may be desired. The frequent changing of lenses can create a great inconvenience to operators of such equipment and can increase the time required for reading and printing documents stored in micrographic form.

U.S. Pat. Nos. 4,750,820; 4,743,102; 4,746,204 and 4,735,951 each disclose a zoom lens as a solution to the above problem. Because each zoom lens provides a variety of magnifications, at most only a few zoom lenses are needed to cover the entire desired magnification range. Zoom lenses disclosed in U.S. Pat. Nos. 4,750,820; 4,743,102 and 4,733,951 have an aperture stop located between the two zooming groups. This type of design usually causes as much as 50% or more vignetting of the light in the corners of the field relative to the axis. With such gross amounts of vignetting, depending upon the angular coverage, the relative illumination of such optical systems can fall to 30%. This is very typical of camera systems. When this occurs in microfilm systems, the observer is forced to stop down the lens system to eliminate the annoying visual effect. However, when this is done the overall illumination dictated objectionable exposure durations. In a reader/printer a zoom lens is commonly located behind a collimator and Dove prism rotator assembly, which is used to rotate the image, and it is obviously important to minimize the size of this assembly. Accordingly, the lens elements near the rotator assembly should be kept small, which can be accomplished by locating the aperture stop near that assembly. U.S. Pat. No. 4,733,951 has an aperture stop located in front of the two zooming optical units. Since the two optical units are a front positive optical unit and a rear negative optical unit, this is a telephoto-type lens. A telephoto lens generally results in a short back focal length compared to its effective focal length. Because in telephoto-type lenses back focus gets smaller with higher magnification, the back focus can impose an upper limit on the obtainable magnification. In addition, having film immediately adjacent to lens elements is inconvenient because of supporting difficulties and, because, if located next to the focal plane, the lens elements themselves need to have good scratch and dig tolerances because scratches and digs in the lens surface will be imaged on the focal plane. For the same reason, if dust or dirt gets in the back of such a system, this will be seen in the image; which require these lens elements to be kept very clean.

U.S. Pat. No. 3,724,927 also discloses a zoom lens system designed for micrographic applications. However, this is a complicated system involving three separate lens assemblies and requires a very long lens with many lens elements, which is inconsistent with the desirability for compactness.

The present invention overcomes the foregoing problems by means of a reader printer zoom lens for use in conjunction with an image rotator assembly to provide a wide range of magnification; minimum vignetting and constant, high illumination; a constant object-to-image distance; a half field coverage greater than 10 degrees; and advantageous utilization of a non-collimated light entering an aperture stop. Also, the optical elements located near the rotator assembly are of relative small aperture and the size of the optical components of that assembly is also correspondingly small.

Other advantages and novel features will become apparent from the following description of illustrative embodiments of the invention illustrated in the accompanying drawings.

BRIEF DESCRIPTION OF THE DRAWINGS

The accompanying drawings, which are incorporated in and constitute a part of the specification, illustrate embodiments of the invention, and together with the description, serve to explain the principles of the invention.

DETAILED DESCRIPTION OF THE ILLUSTRATIVE PREFERRED EMBODIMENTS

The lens systems of the present invention provides variable magnification or zoom lenses that are especially advantageous for use in micrographic reader/printers. All four illustrative embodiments of the present invention are adapted for use with a collimator and prism rotator assembly and have the same object-to-image distance when used with such an assembly. Thus, at most, only a small number of zoom lenses is required to view or print micrographic images having widely different reduction factors. The location of the aperture stop towards the front of the lens system described in the following embodiments minimizes vignetting and increases illumination while minimizing the size of the optical assembly in front of the lens system, e.g. a collimator and prism rotator assembly. Having two moving optical units of positive power further improves compactness of the lens system while providing a relatively large back focal distance.

I have found that, with two movable optical units, aberrations are controlled to acceptable levels and a constant object-to-image distance is maintained, when used with a collimator/prism assembly. It is advantageous to have both zooming optical units of positive power because a negative-positive combination of optical units tends to make the system long and a positive-negative combination of optical units generally results in systems with a short back focus. Having two positive moving optical units provides a compact lens system with a longer back focus than would be the case with positive-negative optical unit combination. A negative-negative combination of optical units makes it difficult to converge light toward an image plane.

When used with the collimator and prism rotator assembly, this invention takes advantage of the fact that light need not be actually collimated when transversing the Dove prism, which allows the lens system to have equal object-to-image plane distances without resorting to telephoto and inverted telephoto designs operating in a fixed stop-to-image distance.

According to this invention, a zoom lens, also herein referred to as a "lens system", comprises, from front-to-rear, a first fixed optical unit having an aperture stop, a second optical unit axially movable for change in magnification, a third optical unit axially movable for change in magnification and for focus control, and, in some of the illustrative embodiments, a fourth optical unit which is fixed. In all of the embodiments the zooming spaces have been desensitized to aberration deterioration with zoom motion.

Figure 1:
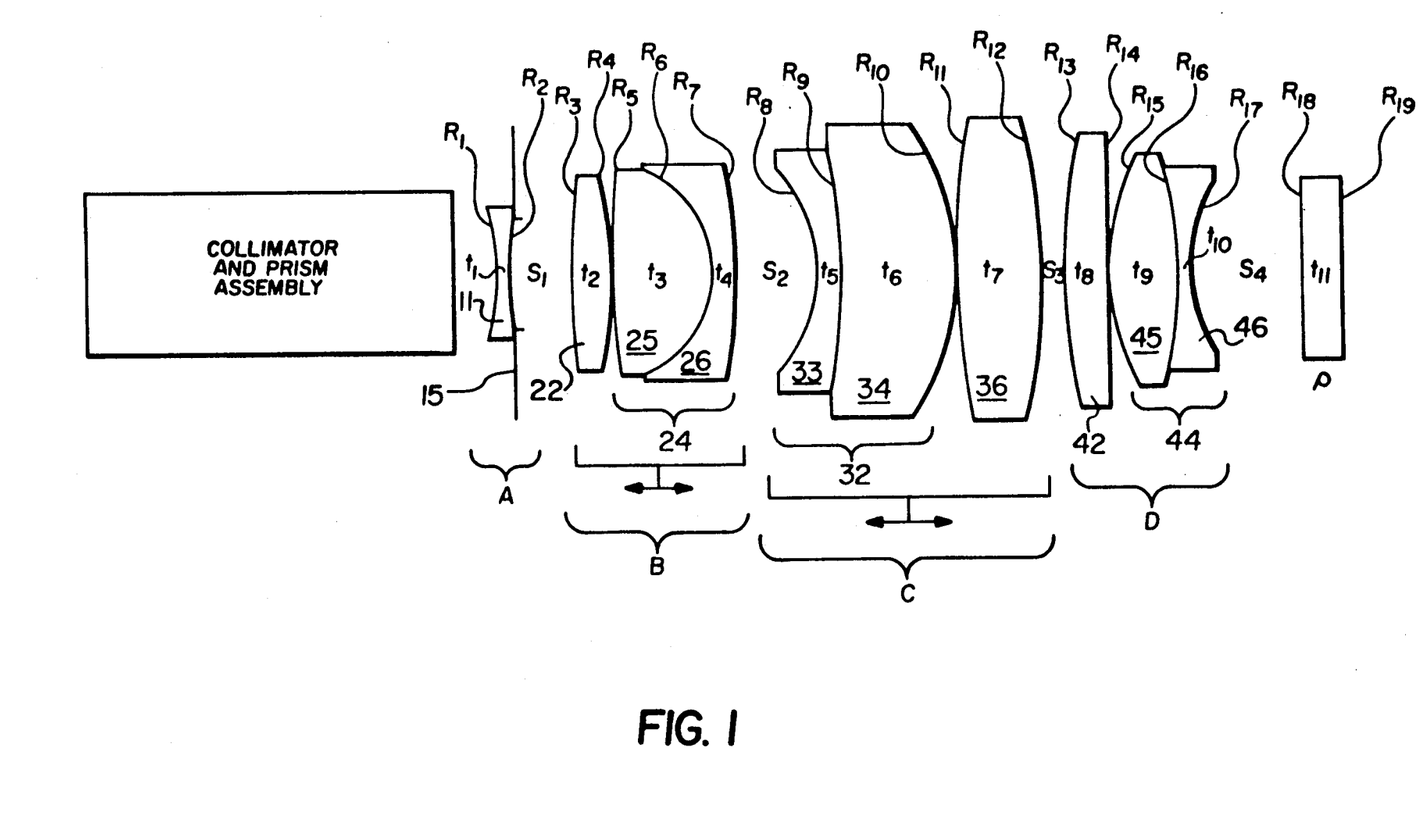
FIG. 1 is a schematic representation of a lens system according to a first illustrative embodiment of the present invention.
Figure 2:
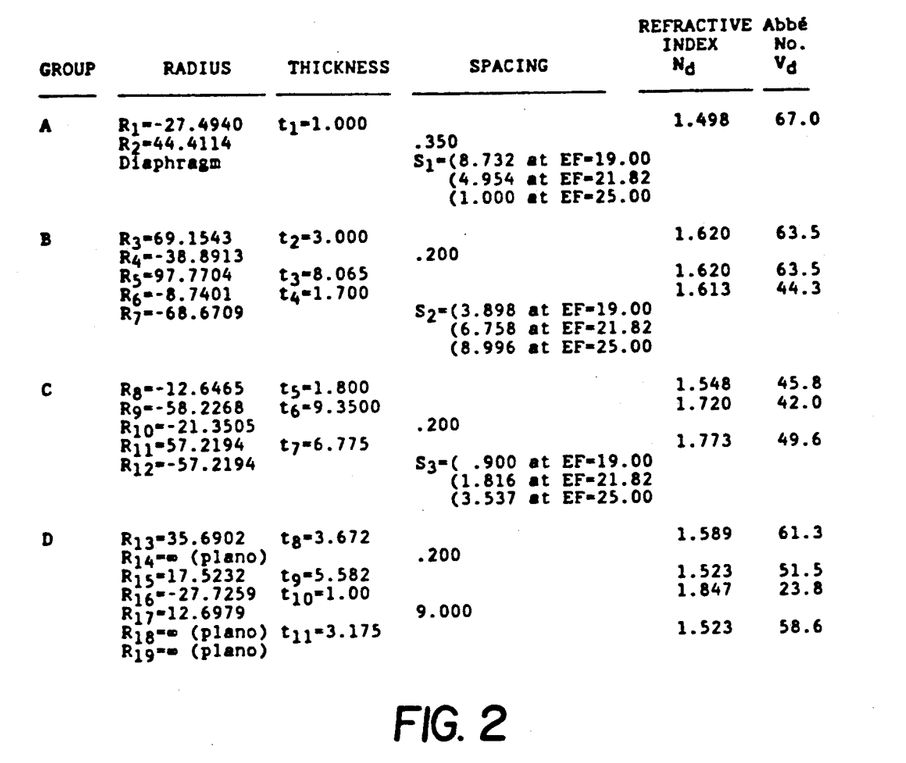
FIGS. 2 and 3 are tables of constructional data for the first embodiment, illustrated in FIG. 1.
Figure 3:
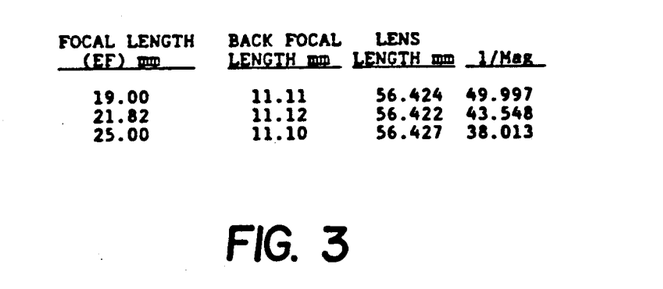

The first zoom lens embodiment illustrated in FIG. 1, comprises four optical units. The lens system includes a first, front fixed optical unit A, provided with a fixed aperture stop 15, a second optical unit B that is movable for zooming, a third optical unit C that is movable for zooming and focus control and a fourth, rear fixed optical unit D. A protection plate P is provided behind the four optical units; however, the back focal length shown in FIG. 3 is measured from the rear vertex of the last lens element and does not include the effect of the plate P. Such a plate does not constitute an "optical unit" for purposes of the present application. The first optical unit A is located nearer or towards the object plane. The movement of the second optical unit B is primarily responsible for the change in magnification. While the movement of the third optical unit C also effects the change in magnification, the third optical unit C is primarily responsible in maintaining a fixed image plane position. The lens system is so structured, that the effective focal length of the overall lens system is varied by changing, relative to each other, distance $S_1$ between the first and second optical units A and B, distance $S_2$ between second and third optical units B and C, and distance $S_3$ between the third and fourth optical units C and D. This lens system varies from the focal length of 19 mm. and f/1.97 to a focal length of 25 mm. and f/2.59, thus providing a 50× to 38× magnification range and a 1.315:1 magnification ratio while maintaining a fixed object to image distance when used with the collimator and prism assembly.

The first front optical unit A has negative refractive power and comprises an aperture stop 15 and a negative biconcave lens component 11 having front and rear surfaces $R_1$ and $R_2$ and thickness $T_1$. The values of the radii of surfaces $R_1$ and $R_2$ and the value $T_1$ as well as the radii of curvature and thicknesses of the rest of the elements are given in Table 1. The aperture stop 15 is fixed and has a clear aperture diameter of 9.64 mm.

The second optical unit B is spaced from the first optical unit A by a variable air gap $S_1$. The second optical unit B has positive refractive power and includes two positive lens components 22 and 24. Lens component 22 is a biconvex lens element having front and rear surfaces $R_3$ and $R_4$ and thickness $T_2$. Lens component 24 is a positive cemented doublet that includes a biconvex lens element 25 and a meniscus lens element 26 The lens element 25 has a front surface $R_5$, a rear surface $R_6$ and a thickness $T_3$. The meniscus lens element 26 has front and rear surfaces $R_6$ and $R_7$, respectively, and thickness $T_4$.

A third optical unit C is spaced from the second optical unit B by a variable air space $S_2$. The third optical unit C has positive refractive power and includes a negative, cemented doublet lens 32 and a positive single lens 36. Lens component 32 includes a meniscus lens negative element 33 and a positive meniscus lens element 34. The lens element 33 has front and rear surfaces $R_8$ and $R_9$, respectively and thickness $T_5$. The lens element 34 has front and rear surfaces $R_9$ and $R_{10}$, respectively and thickness $T_6$. Lens component 36 is a biconvex lens element having front and rear surfaces $R_{11}$ and $R_{12}$ and thickness $T_7$.

The fourth optical unit D is spaced from the third optical unit C by a variable air space $S_3$. The fourth optical unit D is negative and includes a positive single lens component 42 and a negative cemented doublet 44. The radii of curvature for the lens 42 are $R_{13}$ and $R_{14}$, and its thickness is $T_8$. Lens component 44 consists of a biconvex positive lens element 45 with radii of curvature $R_{15}$ and $R_{16}$ and a biconcave negative lens element 46 with radii of curvature $R_{16}$ and $R_{17}$. Lens elements 45 and 46 have thicknesses $T_9$ and $T_{10}$ respectively.

The variation in space $S_1$ between optical units A and B contributes to the focal length change about two times more than an equal increment of variation in space $S_3$. The actual magnitude of the ratios depends on the zoom position. Besides changing the focal length, the increments of change in spaces $S_1$, $S_2$ and $S_3$ also partially compensate for aberrations. For example, some residual negative astigmatism that is introduced as zoom space $S_1$ increases is compensated by a change in zoom space $S_3$.

Figure 4:
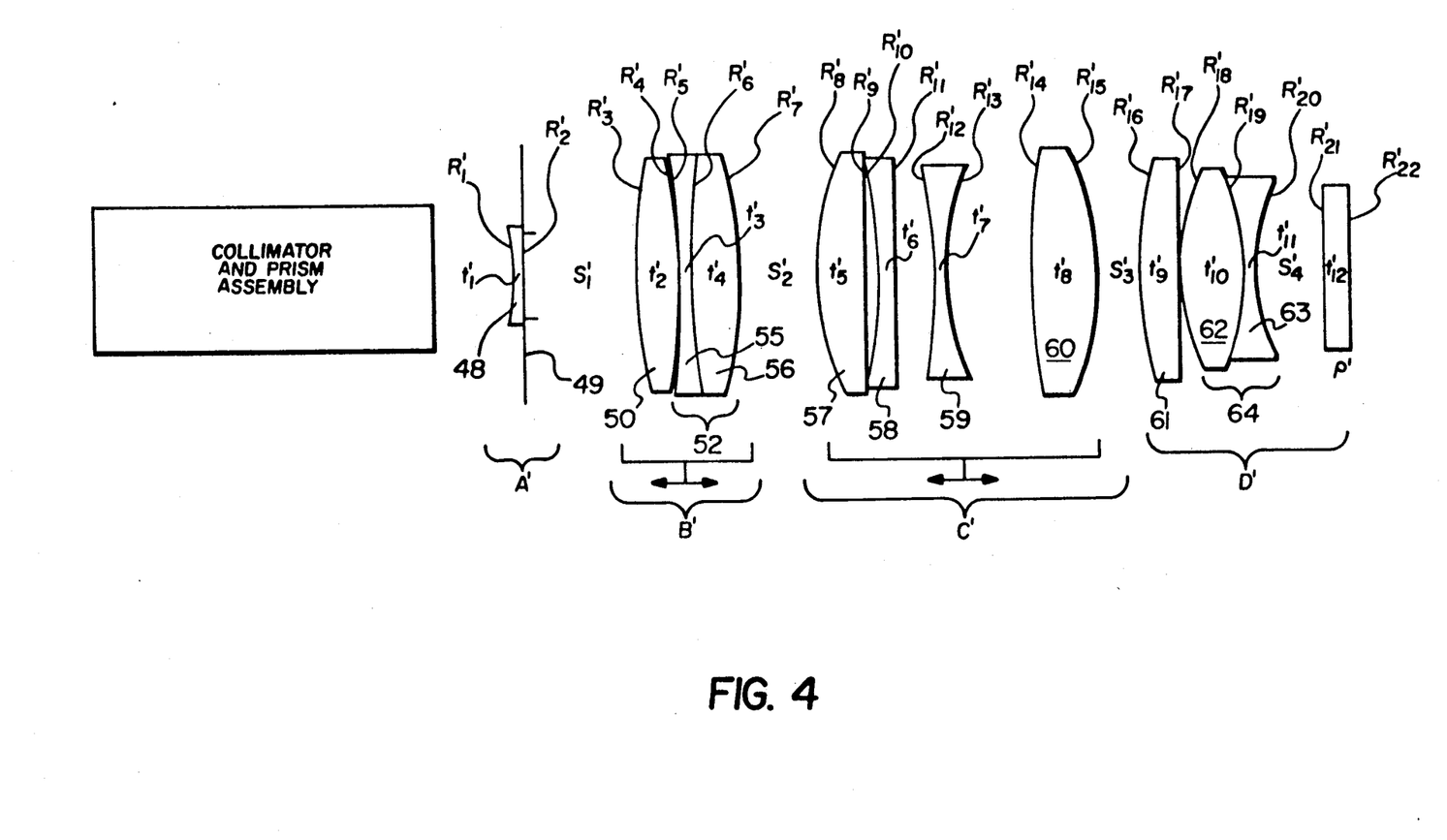
FIG. 4 is a schematic representation of the second illustrative embodiment of the present invention.
Figure 5:
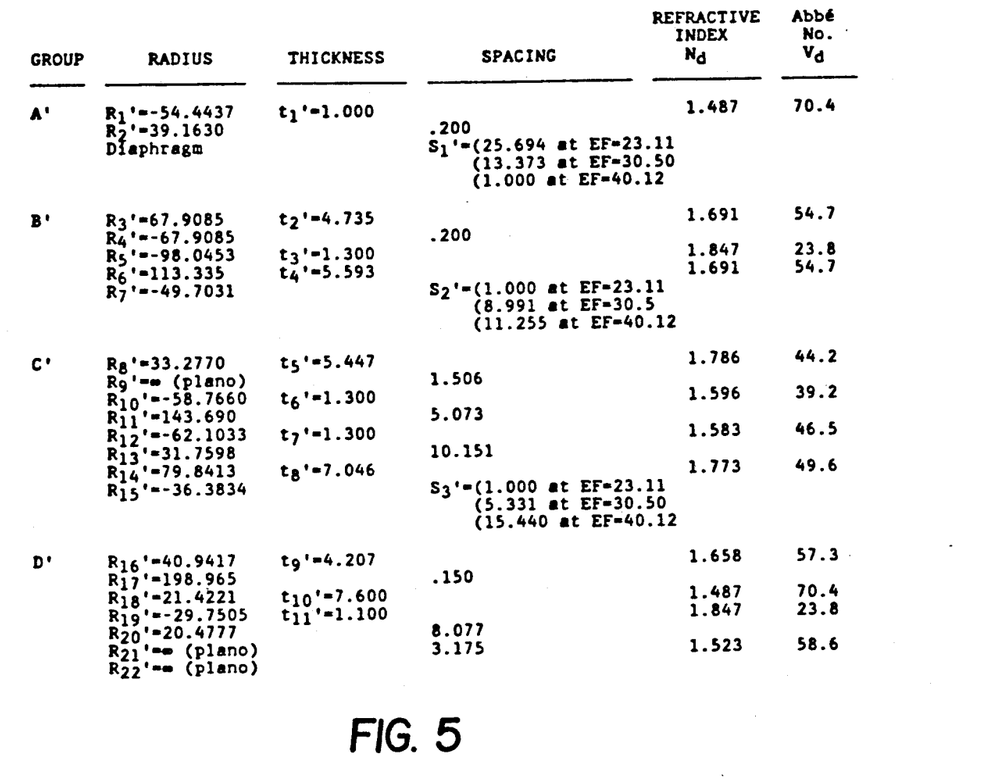
FIGS. 5 and 6 are tables of constructional data for the second embodiment, illustrated in FIG. 4.
Figure 6:
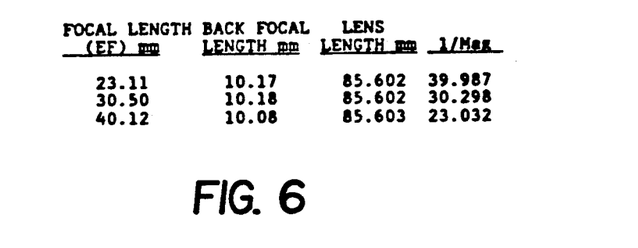

FIG. 4 illustrates a second embodiment of the present invention, which is generally similar in construction the the first embodiment described above and illustrated in FIG. 1. FIGS. 5 and 6 are tables giving the values for the various parameters. In FIG. 4, the four optical units are given the same reference letters, but with a prime (') suffix. Likewise, the variable spacings are given the same reference, but with a single prime suffix added. However, because the shape of lens elements and the number of lens elements in each optical unit differ from one embodiment to another, distinct reference numerals are used for each lens element in each of the embodiments.

As in the case of the first embodiment, in this second embodiment the front optical unit A' is a biconcave negative lens element, and the rear optical unit D' includes of a front, positive single lens component, and a rear, negative cemented doublet. As before, the cemented doublet consists of a front biconvex positive lens element and a rear biconcave negative lens element.

The construction of the second optical unit B' and the third optical unit C' are markedly different from the construction of the optical units D and C in the first embodiment. Unit B' is a positive triplet derivative by which is meant a lens of a positive triplet type (+ − +). For example, such lenses may contain two positive lens components in front, followed by a negative lens component and then a positive lens component. B' has a basic shape of a positive triplet lens, but with the central negative lens element 55 cemented to the rear positive lens element 56. Group C' is also a positive triplet derivative, including a first plano convex positive lens element 57; second, biconcave negative lens element 58; third, biconcave negative lens element 59; and fourth, biconvex positive lens element 60. This particular triplet derivative originated from splitting a central negative lens element of an ordinary positive triplet lens into two negative lens elements.

The ratio of extreme focal length of the second embodiment is 40.1:23.1 or 1.74:1. The lens of the second embodiment provides 40× to 23× magnification range when used with the collimator and prism assembly. The diameter of the aperture stop is 9.69 mm. and, as before, the lens length, the back focal length and the distance from object-to-image when used with a collimator and rotating prism are maintained constant throughout the zooming range.

Figure 7:
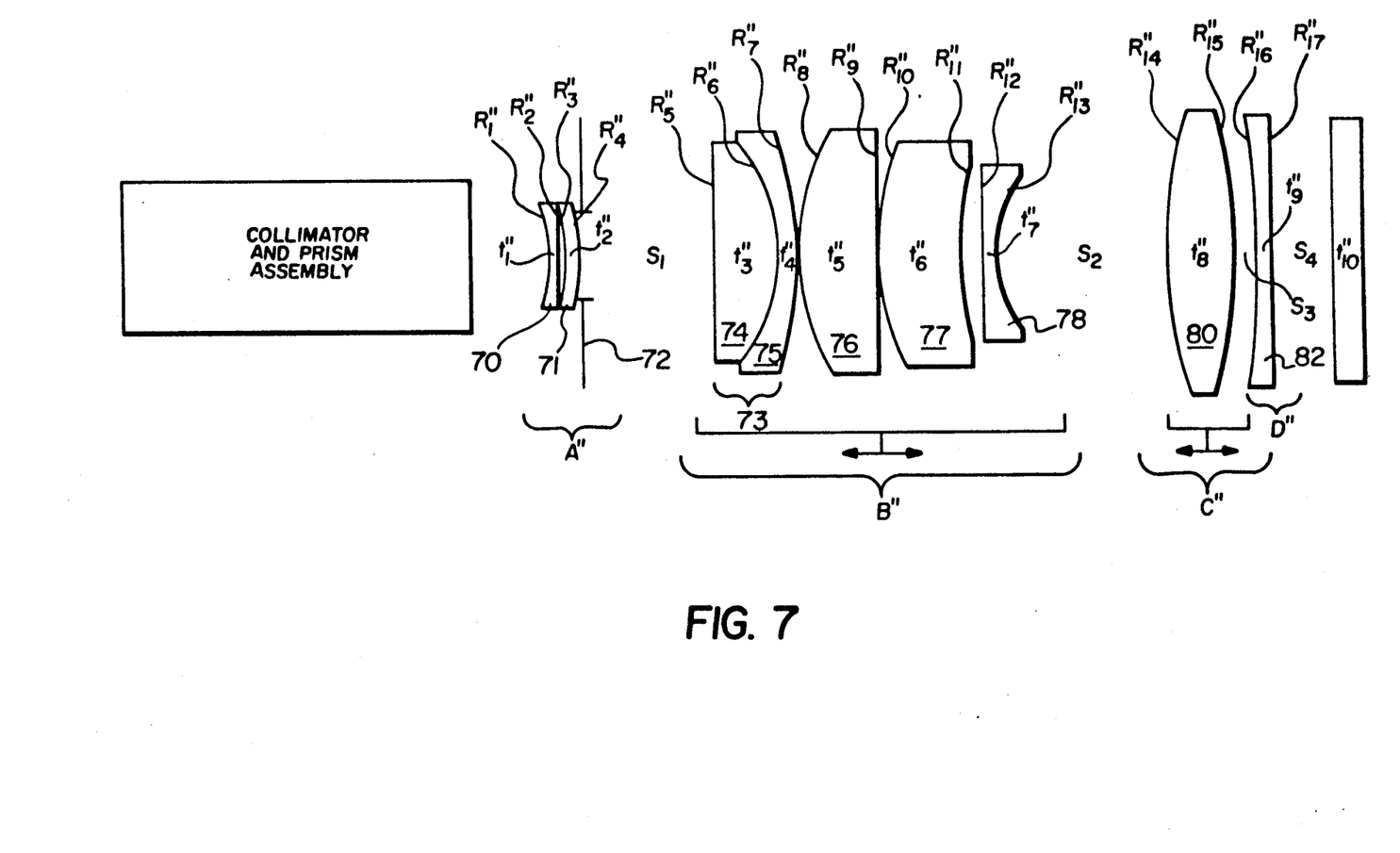
FIG. 7 is a schematic representation of a third illustrative embodiment of the present invention.
Figure 8:
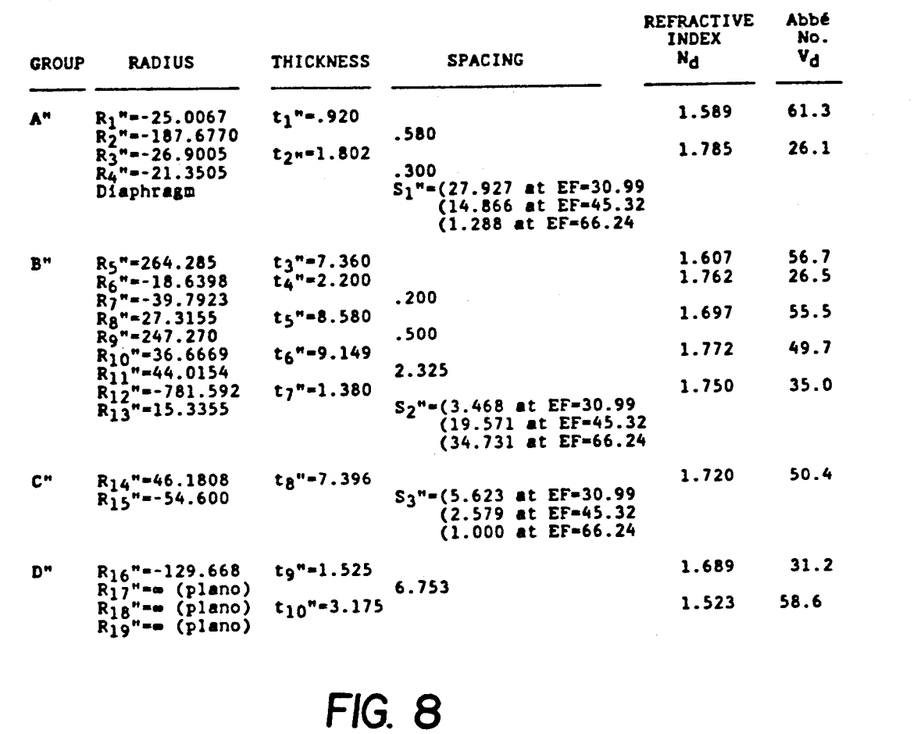
FIGS. 8 and 9 are tables of constructional data for the third embodiment, illustrated in FIG. 7.
Figure 9:
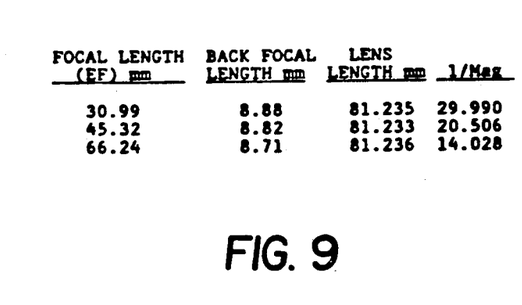

FIG. 7 illustrates a third embodiment of the same invention and FIGS. 8 and 9 are tables giving the values of the various parameters. The ratio of extreme focal length of the third embodiment is 66:31 or 2.1:1 and magnification range is 30× to 14× when used with the collimator and prism assembly. In FIG. 7 the four optical units are given the same reference letters as their counterparts in the first embodiment described above and illustrated in FIG. 1, but with the addition of a double prime (") suffix. Likewise, the variable spacings are given the same reference, but with a double prime suffix added.

In this third embodiment, the first, front optical unit A" includes two lens components 70 and 71. Lens component 70 is a negative meniscus lens element and lens component 71 is a positive meniscus lens element. Unit B" includes four lens components: a positive cemented lens component 73, a positive meniscus lens component 76, a positive meniscus lens component 77, and a biconvex negative lens component 78. The positive cemented lens component 73 consists of a biconvex positive lens element 74 and a negative meniscus lens element 75. Unit C" consists of a single biconvex lens element 80, and optical unit D" consists of a single, plano-concave lens element 82. While in this third embodiment, optical units C" and D" are two distinct and separate optical units, optical units C" and D" could be merged into one single moving optical unit, resulting in a configuration of three optical units, one of which is fixed and two of which are moving. This is illustrated in the embodiment described below.

Figure 10:
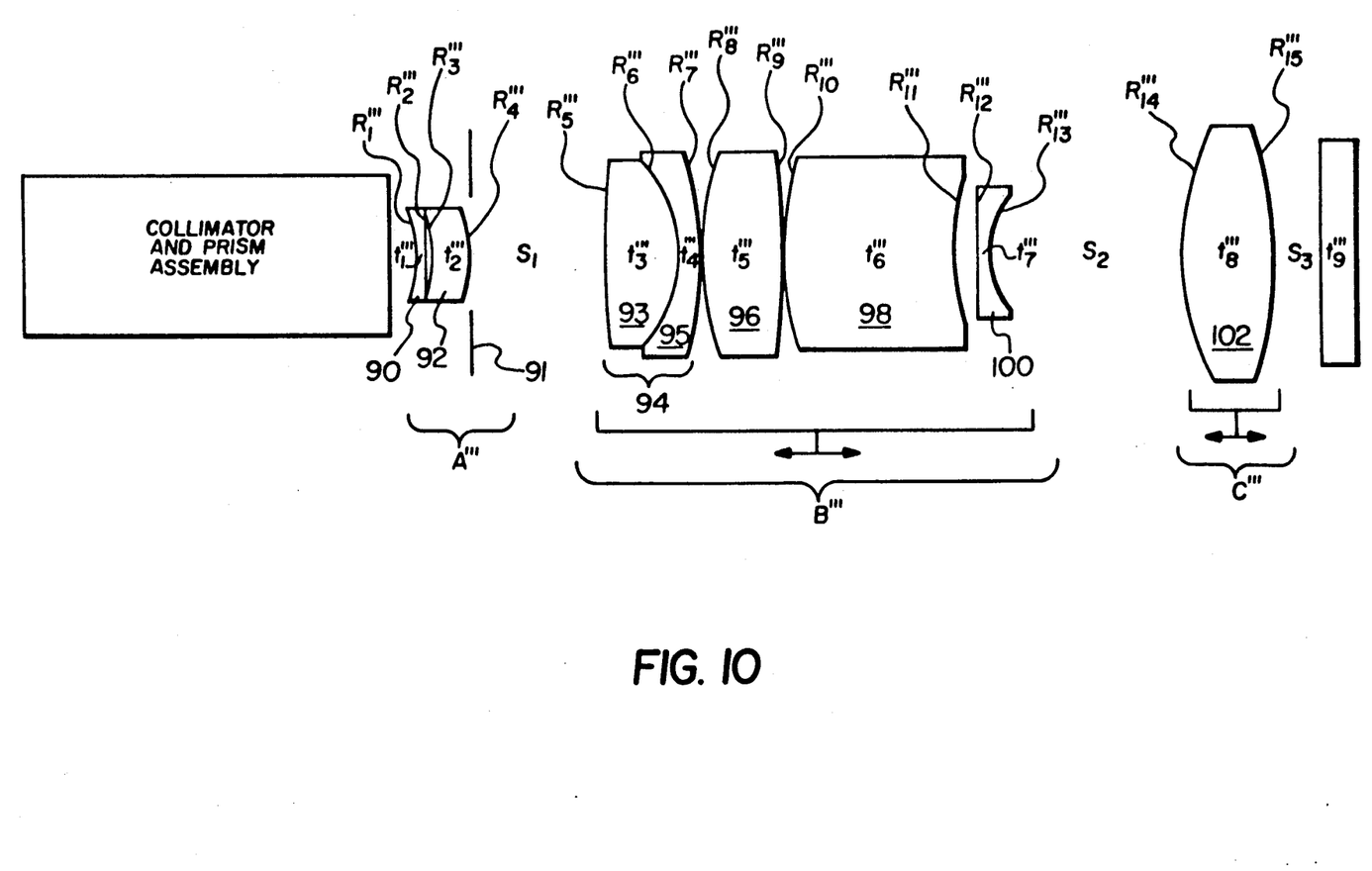
FIG. 10 is a schematic representation of a fourth illustrative embodiment of the present invention.
Figure 11:
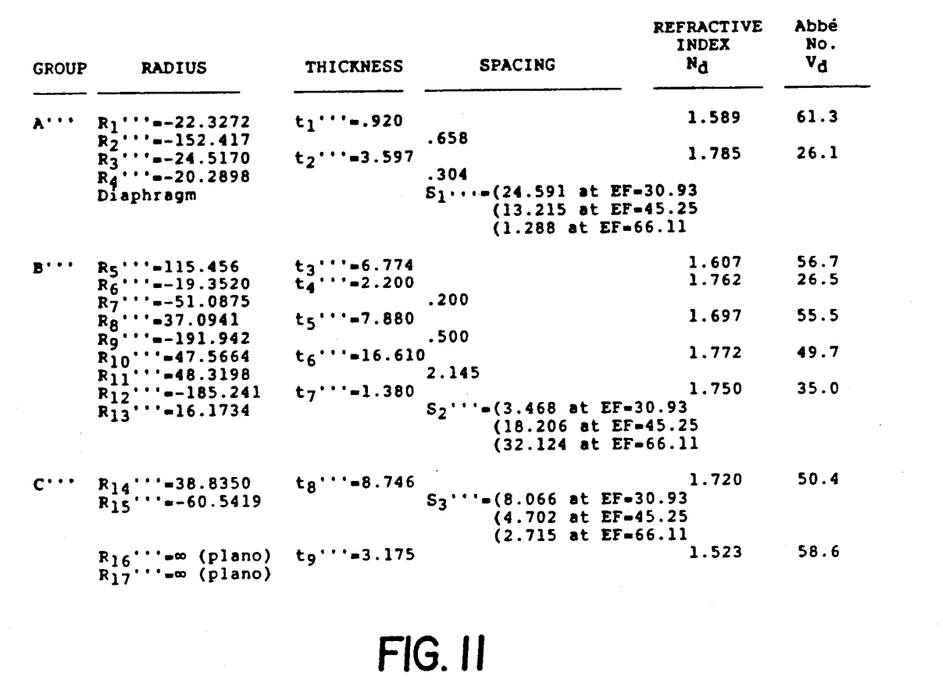
FIGS. 11 and 12 are tables of constructional data for the fourth embodiment illustrated in FIG. 10.
Figure 12:
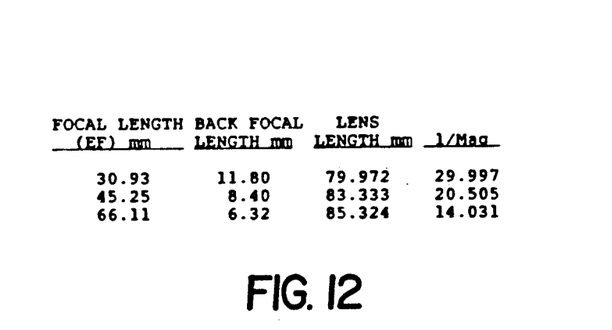

FIG. 10 illustrates the fourth embodiment of the invention and FIGS. 11 and 12 are tables giving the values of the various parameters. In FIG. 10 the optical units are given the same reference letters as their counterparts in the first embodiment described above and illustrated in FIG. 1, but with the addition of a triple (''') suffix. Likewise, the variable spacings are given the same reference characters, but with a triple prime suffix added.

In this fourth embodiment, the first three optical units A''', B''' and C''' are similar to the first three optical units A", B" and C" of the third embodiment, except that there is no corresponding optical unit D'''.

As in the case of a third embodiment, the optical unit A''' includes a negative meniscus lens component 90 and a positive meniscus lens component 92, the optical unit B''' includes four lens components 94, 96, 98 and 100 and optical unit C''' consists of a single positive lens component 102. As before, optical unit B''' includes a first positive cemented lens component 94; a second, positive meniscus lens component 96; a third positive meniscus lens component 98 and a fourth, biconvex negative lens component 100. The positive cemented lens component 94 in optical unit B''' consists of a biconvex positive lens element 93 and a negative meniscus lens element 95.

While in the above-described embodiments, the fixed aperture stop is located towards the back of the first optical unit, it is to be understood that the aperture stop may be located near the front of the first optical unit, or between the elements included in the first fixed optical unit. Furthermore, it may be possible that the first, fixed optical unit A consists of an aperture stop only. In this case the invention will always comprise optical units A, B and C and the powers of a second optical unit and a third optical unit will be positive.

While the general zoo lens configuration of the present invention is common to the four illustrative embodiments; i,e., two moving optical units following a fixed optical unit provided with a fixed aperture stop, the shape of the lens elements and the number of lens elements in each optical unit differ from one configuration to another. For illustrative purposes the following three examples are given below:

1. The second optical unit in the first embodiment consists of two lens components and three lens elements, while the second optical unit in the second embodiment consists of four lens components and five lens elements.

2. The last lens element in the second optical unit is negative in the first embodiment, but is positive in the third embodiment.

3. The third optical unit of the third embodiment consists of four air-spaced single lens elements, but, the third optical unit of the second embodiment consists of a single positive lens element.

While the above-mentioned magnification ratios of illustrated embodiments of the invention are 1.315:1; 1.736:1 and 2.13:1, it should be obvious that the invention may be embodied successfully in zoom lenses having different magnification ratios as well. Similarly, it should be understood that the focal lengths and other system parameters of the illustrative embodiments can be scaled up or down for different applications.

Although this invention is particularly useful in micrographic reader/printers, it is also applicable to photographic or other objectives. It can be used as a stand-alone lens system, or be used in conjunction with an add-on front lens system, and as such, will vary magnification ratio or object-to-image distance.

In the embodiments specifically described above all of the surfaces are spherical, but it is to be understood that other embodiments of this invention may have nonspherical surfaces.

The invention has been described in detail with particular reference to illustrative preferred embodiments, but it will be understood that variations and modifications can be effected within the spirit and scope of the invention.

What is claimed is:

1. A zoom lens having an optical axis and comprised of a plurality of lens components centered on said optical axis and arranged in at least three optical units, two of which are movable to vary the focal length of said zoom lens, said zoom lens including: a front, fixed optical unit provided with a fixed aperture stop; a second optical unit that is axially movable for zooming located behind said front optical unit, said second optical unit having positive power; a third optical unit immediately following said second optical unit that is axially movable for zooming located behind said front optical unit and said second optical unit, said third optical unit having positive power; and a fourth fixed optical unit.

2. A zoom lens having an optical axis and comprised of a plurality of lens components centered on said optical axis and arranged in at least three optical units, two of which are movable to vary the focal length of said zoom lens, said zoom lens including: a front, fixed optical unit provided with a fixed aperture stop, said front fixed optical unit having negative power; a second optical unit that is axially movable for zooming located behind said front optical unit, said second optical unit having positive power; a third optical unit immediately following said second optical unit that is axially movable for zooming located behind said front optical unit and said second optical unit, said third optical unit having positive power; and a fourth fixed optical unit.

3. A zoom lens according to claim 1 or 2 in which movement of said third optical unit also affects focussing.

4. A zoom lens according to claim 1 or 2 wherein said fourth, fixed optical unit has negative power.

5. A zoom lens according to claim 4 in which movement of said third optical unit also affects focussing.

6. A zoom lens comprising a fixed aperture stop located in front of at least three optical units, said zoom lens including two moving optical units located in front of a fixed optical unit, wherein said first moving optical unit has positive power.

7. A zoom lens comprising a fixed aperture stop located in front of at least three optical units, said zoom lens including two optical units movable for zooming, and a rear, fixed optical unit, wherein said first moving optical unit has positive power.

8. A zoom lens comprising a fixed aperture stop located in front of at least three optical units, said zoom lens including two moving optical units, located in front of a fixed optical unit, wherein said two moving optical units both have positive power.

9. A zoom lens comprising a fixed aperture stop located in front of at least three optical units, said zoom lens including two optical units movable for zooming, and a rear, fixed optical unit, wherein said two moving optical units are both positive.

10. A zoom lens according to claims 6, 7, 8 or 9 wherein said fixed optical unit is negative.

11. A zoom lens comprising at least four optical units, two of which are movable axially to vary the focal length of the system, said zoom lens including a front, fixed optical unit provided with the fixed aperture stop; a second optical unit axially movable for zooming; a third optical unit, axially movable for zooming; and a fourth, fixed optical unit, said front optical unit having negative power.

12. A zoom lens according to claim 11, wherein said third optical unit has positive power.

13. A zoom lens according to claim 12; wherein said fourth, fixed optical unit is negative.

14. A zoom lens according to claim 11 wherein said fourth, fixed optical unit is negative.

15. A zoom lens comprising at least four optical units, two of which are movable axially to vary the focal lengths of said zoom lens, said zoom lens including a front, fixed optical unit provided with a fixed aperture stop; a second optical unit, said second optical unit having positive power and being axially movable to provide zooming; a third optical unit, said third optical unit being axially movable for zooming, and a fourth, fixed rear optical unit.

16. A variable focal length lens system for use in micrographic projectors and printers, said lens system comprising four optical units, namely:
 1) a first, fixed optical unit including a fixed aperture stop;
 2) a second, axially movable optical unit to provide zooming action, said second optical unit having positive power;
 3) a third, axially movable optical unit to provide zooming action; and
 (4) a fourth, fixed rear optical unit.

17. A variable focal length lens system according to claim 11, wherein said first optical unit is negative.

18. A variable focal length lens system according to claim 16 or 17, wherein said third optical unit has positive power.

19. A variable focal length lens system for use in micrographic projectors and printers, said lens system consisting of four optical units, namely:
 1) a first, fixed optical unit including a fixed aperture stop;
 2) a second, axially movable optical unit to provide zooming action, said second optical unit having positive power;
 3) a third, axially movable optical unit to provide zooming action; and
 4) a fourth, fixed rear optical unit.

20. A zoom lens comprising four optical units arranged from front-to-back as follows:
 a fixed optical unit comprising at least one negative lens element and further including a fixed aperture stop;
 a first positive optical unit movable for zooming said first positive optical unit comprising at least two lens components;
 a second positive optical unit movable for zooming, said second positive optical unit comprising two lens components; and
 a fixed rear optical unit comprising at least two lens components.

21. A zoom lens according to claim 20, wherein said fixed rear optical unit is negative.

22. A zoom lens according to claims 20 or 21, wherein said first positive optical unit includes at least one positive lens element and at least one negative lens element.

23. A zoom lens according to claim 22 wherein said second positive optical unit includes at least one positive lens element on at least one negative lens element.

24. A zoom lens according to claim 23 wherein said second positive optical unit includes at least one positive lens element and at least one negative lens element.

25. A zoom lens according to claim 20 wherein:
said first positive optical unit comprises a first, positive lens element followed by a second, positive lens element and a third, negative lens element;
said second positive optical unit comprises a first, negative lens element, a second, positive lens element and a third, positive lens element; and
said fixed rear optical unit comprises a first, positive lens element, a second, positive lens element and a third, negative lens element.

26. A zoom lens according to claim 20, wherein
said first positive optical unit comprises a first, positive lens element, a second, negative lens element, and a third, positive lens element;
said second positive optical unit comprises a first, positive lens element, a second, negative lens element, a third, negative lens element, and a fourth, positive lens element; and
said fixed rear optical unit comprises a first, positive lens element, a second, positive lens element, and a third, negative lens element.

27. A zoom lens according to claim 26, wherein said second, negative lens element of the first positive optical unit is cemented to said third, positive lens element of the first optical unit; and
said second, positive lens element of said fixed rear optical unit is cemented to said third, negative lens element of said fixed rear unit.

28. A zoom lens according to claim 20, wherein said first positive optical unit comprises a single positive biconvex lens element and a cemented doublet located therebehind;
said second positive optical unit comprises a cemented doublet and a biconvex element located therebehind; and
said fixed rear element comprises a positive lens element and a cemented doublet located therebehind.

29. A zoom lens comprising four optical units arranged from front-to-back as follows:
a fixed optical unit comprising a negative lens element and further including a fixed aperture stop;
a first positive optical unit movable for zooming, said first positive optical unit comprising at least two positive components and at least one negative component;
a second positive optical unit movable for zooming, said second positive optical unit comprising at least one positive lens element; and
a fixed rear optical unit comprising at least one negative lens element.

30. A zoom lens according to claim 29, wherein said first optical unit comprises a first, positive lens element, a second, negative lens element, a third, positive element, a fourth, positive lens element and a fifth, negative lens element.

31. A zoom lens according to claim 29, wherein said fixed optical unit further comprises a positive lens element.

32. A zoom lens comprising three optical units arranged from front-to-back as follows:
a fixed optical unit comprising an aperture stop and at least one negative lens element and at least one positive lens element;
a first positive optical unit movable for zooming, comprising a cemented doublet component having a first, positive lens element cemented to a second, negative meniscus lens element; a third, positive lens element; a fourth, positive lens element; and a fifth, negative lens element having a concave rear surface; and
a second, positive optical unit comprising a negative lens element.

* * * * *